United States Patent [19]

DiPaola

[11] Patent Number: 5,074,590
[45] Date of Patent: Dec. 24, 1991

[54] SEAT BELT BUCKLE STORAGE AND SYSTEM

[75] Inventor: Donald A. DiPaola, Mount Clemens, Mich.

[73] Assignee: Allied-Signal Inc., Morris Township, Morris County, N.J.

[21] Appl. No.: 532,042

[22] Filed: May 30, 1990

[51] Int. Cl.⁵ .............................................. B60R 22/12
[52] U.S. Cl. ............................... 280/808; 297/468; 297/481
[58] Field of Search ...................... 24/665, 672, 664; 297/468, 481; 280/801, 808

[56] References Cited

U.S. PATENT DOCUMENTS

| | | | |
|---|---|---|---|
| 3,243,233 | 3/1966 | Davis | 297/481 |
| 3,400,978 | 9/1968 | Totten | 297/481 |
| 3,401,980 | 9/1968 | Nicholas | 297/481 |
| 3,491,966 | 1/1970 | Curran et al. | 297/481 |
| 3,532,361 | 10/1970 | Hrynik | 280/808 |
| 3,630,543 | 12/1971 | Cripps et al. | 297/481 |
| 3,788,664 | 1/1974 | Gray et al. | 297/481 |
| 4,057,290 | 11/1977 | Arina | 297/481 |
| 4,418,939 | 12/1983 | Miller | 280/808 |
| 4,466,162 | 8/1984 | Pogharian et al. | 24/664 |
| 4,548,425 | 10/1985 | Evans | 297/481 |

FOREIGN PATENT DOCUMENTS

| | | | |
|---|---|---|---|
| 1004838 | 9/1965 | United Kingdom | 297/481 |
| 1172458 | 12/1969 | United Kingdom | 297/481 |
| 1229896 | 4/1971 | United Kingdom | 297/481 |

*Primary Examiner*—Charles A. Marmor
*Assistant Examiner*—Tamara L. Finlay

[57] ABSTRACT

An auxiliary storage buckle assembly (50), of integral construction for storing a latch plate (36, 60), a safety belt (30) when not restraining an occupant of a vehicle including a base (54), and a cover (8) defining a slot (58) for receiving the latch plate (36, 60), a lock plate (70) having a resilient stem portion (72) cantilevered from a portion of the base (54) proximate the entrance of the slot, and movable in a direction generally perpendicular to the direction of insertion of the latch plate for interacting with an opening (62) in the latch plate for securing same thereto. Various alternate embodiments of a storage assembly (50') are illustrated wherein such assembly (50') may be inserted within an opening in the interior facia or trim of a vehicle or fabricated as an integral part thereof.

12 Claims, 3 Drawing Sheets

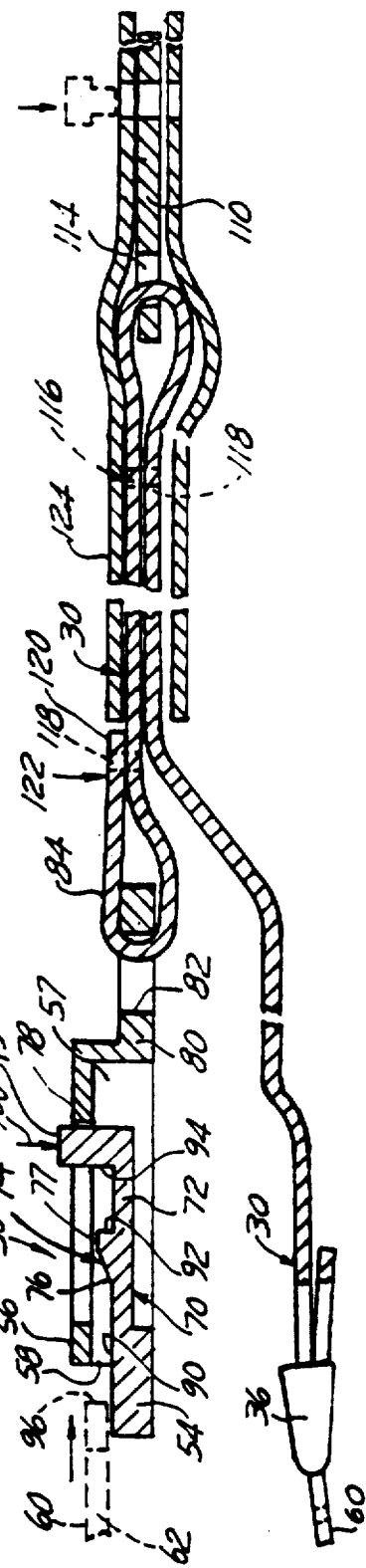
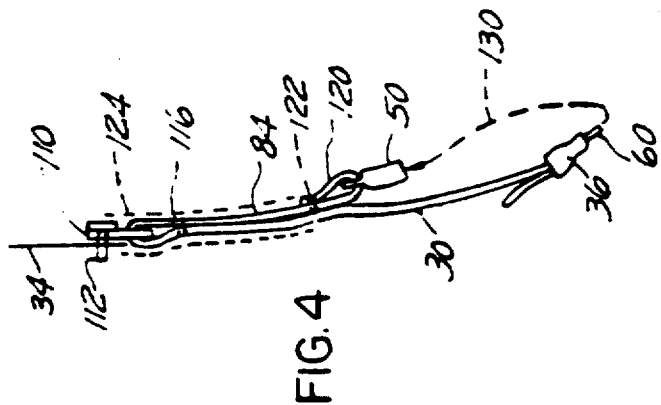
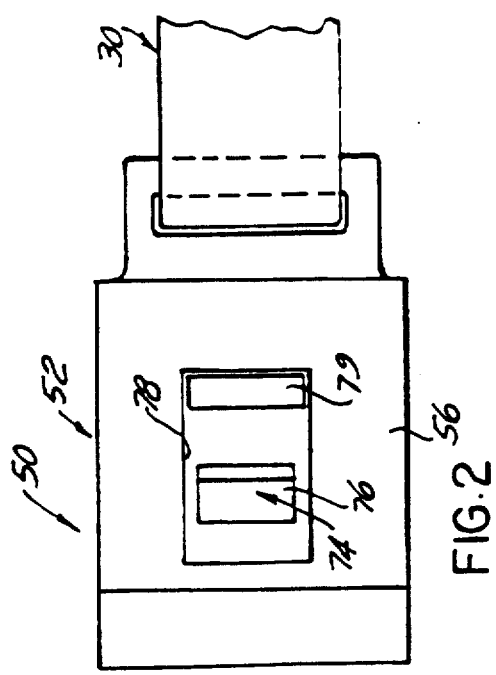

SEAT BELT BUCKLE STORAGE AND SYSTEM

BACKGROUND AND SUMMARY OF THE INVENTION

This patent application relates generally to seat belts and safety belt systems for occupant protection.

FIG. 1 is an exemplary prior art seat belt system. Such system as illustrated is a four point system comprising a seat belt retractor 22, a seat belt 24 and a buckle assembly 26 adapted to be secured to a vehicle frame in a known manner. Also provided in this prior art system is a shoulder belt shown as 30 attached via an anchor 32 to a reinforced portion of the vehicle proximate its roof line 34. The shoulder belt includes a tongue plate 36 adapted to be received within a connector 38 of known variety which is similarly secured to the vehicle structure in a known manner. In the illustrated four point system when the seat belt tongue plate 28 is removed from its buckle 26 the retractor retracts same so that when not in use the seat belt is stored within the retractor. This is not the case with regard to the shoulder belt 30 since the illustrated system does not include a shoulder belt retraction mechanism. Upon disengagement of the tongue plate 36 from its corresponding connector 38 the shoulder belt 30 lies loosely about the seat 40 or dangles loosely somewhere within the passenger compartment. This arrangement at a very minimum provides a source of inconvenience to the occupant in that the tongue plate 36 may be trapped between the vehicle side wall and seat 40, be positioned within the door jamb, 35 damaged, etc.

It is an object of the present invention to provide a means for storing the latch plate of a shoulder belt when not in use. A further object of the present invention is to improve upon prior art seat belt systems An additional object of the present invention is to provide a shoulder belt storage mechanism that is easy to manufacture and of modest incremental cost.

Accordingly, the invention comprises: a one-piece buckle assembly for storing a latch plate of a safety belt when not restraining an occupant of a vehicle. More specifically, the buckle assembly comprises a base and a cover defining a first opening to provide a slot for receiving the latch plate of the safety belt. The assembly also includes a lock plate having a resilient stem portion cantilevered from a portion of the base proximate the entrance of the slot, and movable in a direction generrally perpendicular to the direction of insertion of the latch plate. The lock plate is integrally formed as part of the stem portion and is positioned in the path of the latch plate and forms a lower surface of the slot. The lock plate includes lock means for engaging an opening in the latch plate and a release button formed as an integral part of the lock plate for moving the lock means out from the latch plate opening to permit retraction of the latch plate.

Many other objects and purposes of the invention will be clear from the following detailed description of the drawings.

BRIEF DESCRIPTION OF THE DRAWINGS

In the drawings
FIG. 2 is a top view of a storage buckle assembly.
FIGS. 3 and 4 show the storage buckle mechanism and shoulder belt.

DETAILED DESCRIPTION OF THE DRAWINGS

Figure 1:
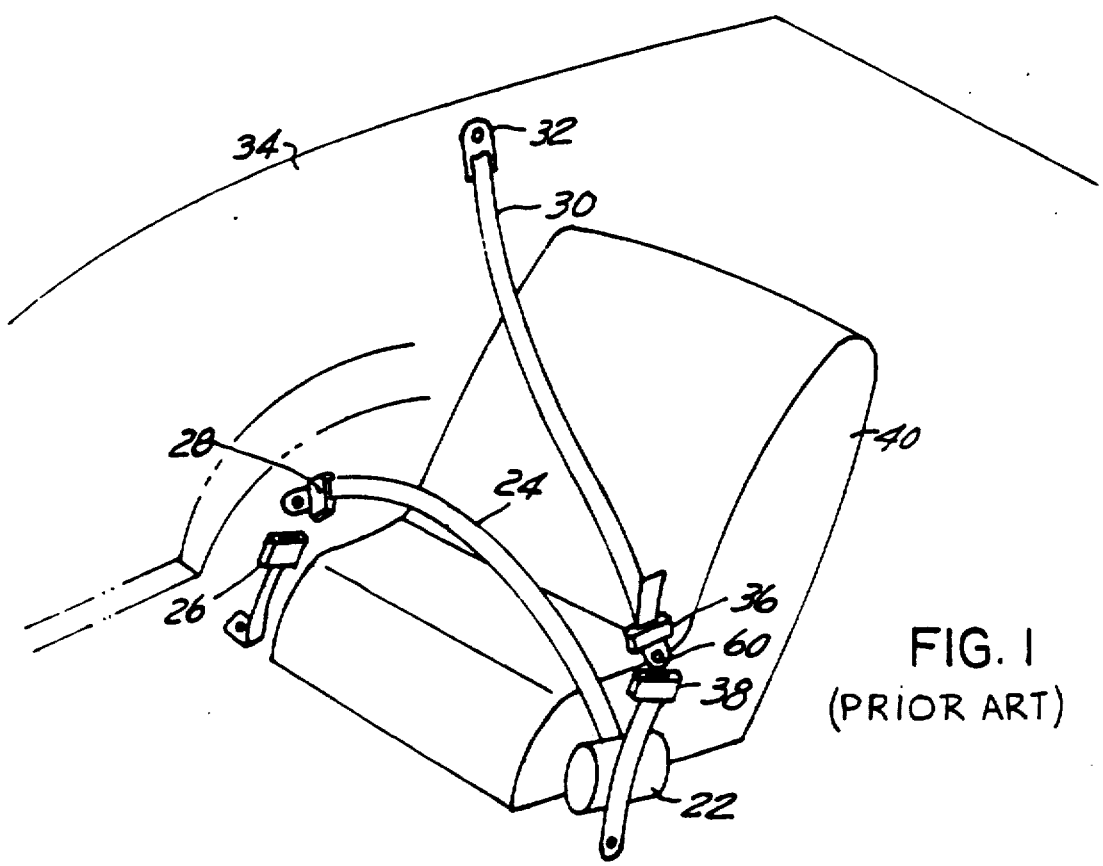
FIG. 1 is illustrative of a prior art seat belt system.

Reference is made to FIGS. 2, 3 and 4 which illustrate a seat belt storage mechanism 50 in accordance with the present invention. With regard to the first embodiment shown in the above figures, the seat belt storage mechanism comprises a buckle 52 of unitary construction including a base 54 and a cover 56 integrally formed therewith. The cover includes sides 57, defining, in concert with the cover or top an opening or slot 58 for receipt of the tongue 60 of the latch plate 36. The distance between the top 56 and base 54 is slightly larger than the width of the tongue 60 so that the slot 58 provides a means for guiding the tongue as it is inserted further within the buckle 52. The tongue 60, as is common in the art, includes an opening 62. The mechanism 50, proximate the slot 58, includes an integrally formed lock plate 70. As shown in FIGURE 3, the lock plate 70 is cantilevered from the base 54. The lock plate further includes a stem portion 72 and a locking member 74. The locking member 74 in the embodiment shown includes a ramped surface 76 terminating at a flat section 77. Also extending from the lock plate 70 is a release button generally shown as 79. The release button extends through an opening 78 formed within the top 56. The base 54 may further include a flange 80 including an opening 82 for receipt of the safety belt webbing 30.

It is contemplated that the buckle 52 may be fabricated by molding the above described components as an integral whole. One such material that may be used in the molding of the buckle 52 is super tuff nylon A.B.S. or polypropolene.

The lock plate 70 provides a slide surface 90 to receive and guide the tongue 60 as it is inserted within the slot 58. As can be seen from the figures, the lock plate 70 also forms the lower surface of the slot 58. In operation the latch plate 36 comprising the tongue 60 will be inserted within the mechanism 50, and more particularly as the tongue 60 is inserted therein, it engages the ramped surface 76 causing the integrally fabricated stem portion to move downwardly. As the tongue is further inserted within the slot 58, the opening 62 overrides the ramped portion 76 and becomes trapped against the shoulder 92. To prevent rattle of the tongue 60 while within the mechanism 50, an edge 94 of the release button 79 may be spaced relative to the shoulder 92 such that the spacing is slightly larger than the spacing between the outermost edge of the opening 62 and the end 96 of the tongue 60. When it is desired to remove the latch plate 36, i.e., tongue 60, from its stored condition, the occupant presses on the release button in the direction of arrow 100, causing the integrally connected lock plate 70 to be deflected below the lower edge of the tongue thereby permitting same to freely slide out of the mechanism 50.

FIGS. 3 and 4 illustrates a modification of the shoulder belt 30 shown in FIG. 1 incorporating the present invention. There is shown a shoulder belt 30 secured to the vehicle 34 by an anchor plate 110 and fastener 112. The shoulder belt extends through an opening 114 in the anchor plate, and is secured at a first location 116 by a stitch pattern 118. A portion of the shoulder belt webbing 84 extends downwardly approximately eight to ten inches from the anchor plate 110 and is received through the opening 82 wherein one end 120 of the webbing is secured to the main portion of the belt at another location such as 122 by a stitch pattern or other securement technique. As can be seen from FIGS. 3 and 4, the webbing which extends to the buckle mechanism 50 is movable relative to the main section of webbing 30 in view of the stitch patterns used. It is further contemplated by the present invention that a sleeve or boot 124 may overlay the shoulder belt webbing 30 from the anchor plate 110 to proximate the buckle mechanism 50 thereby providing a streamlined and compact arrangement.

As mentioned, the intended use of the present invention is to provide a storage mechanism for a seat belt webbing and in particular a shoulder belt. When the occupant releases the latch plate 36 from its corresponding buckle 38, the latch plate 36 and in particular the tongue 60 is inserted within the slot 58 of the storage mechanism 50 in a manner designated by the arrow 130 of FIG. 4, thereby providing a simple yet compact means for storing the shoulder belt 30.

Figure 5:
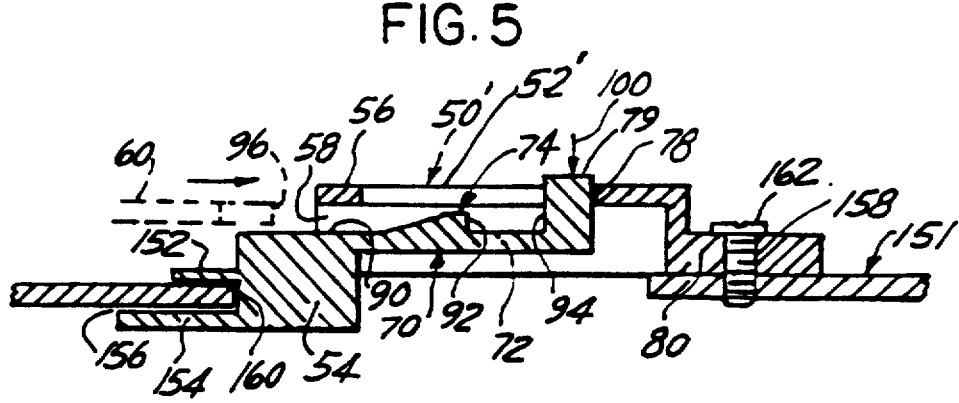
FIGS. 5 and 6 illustrate alternate embodiments of the present invention.
Figure 7:
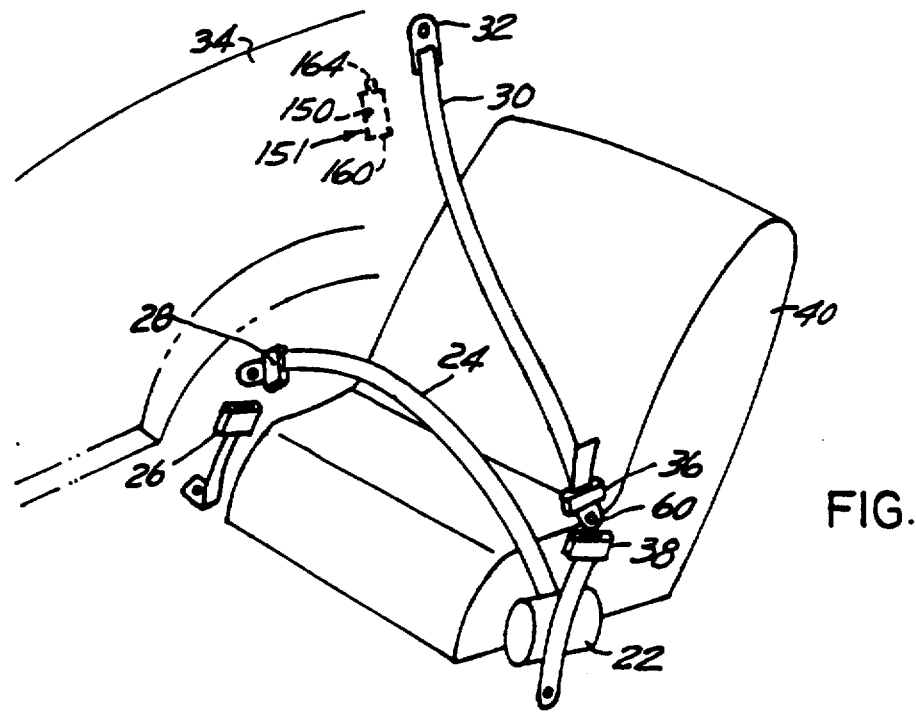
FIGS. 7 and 8 illustrate the various openings in the side trim or fascia of the interior of a vehicle proximate a seat.
Figure 8:
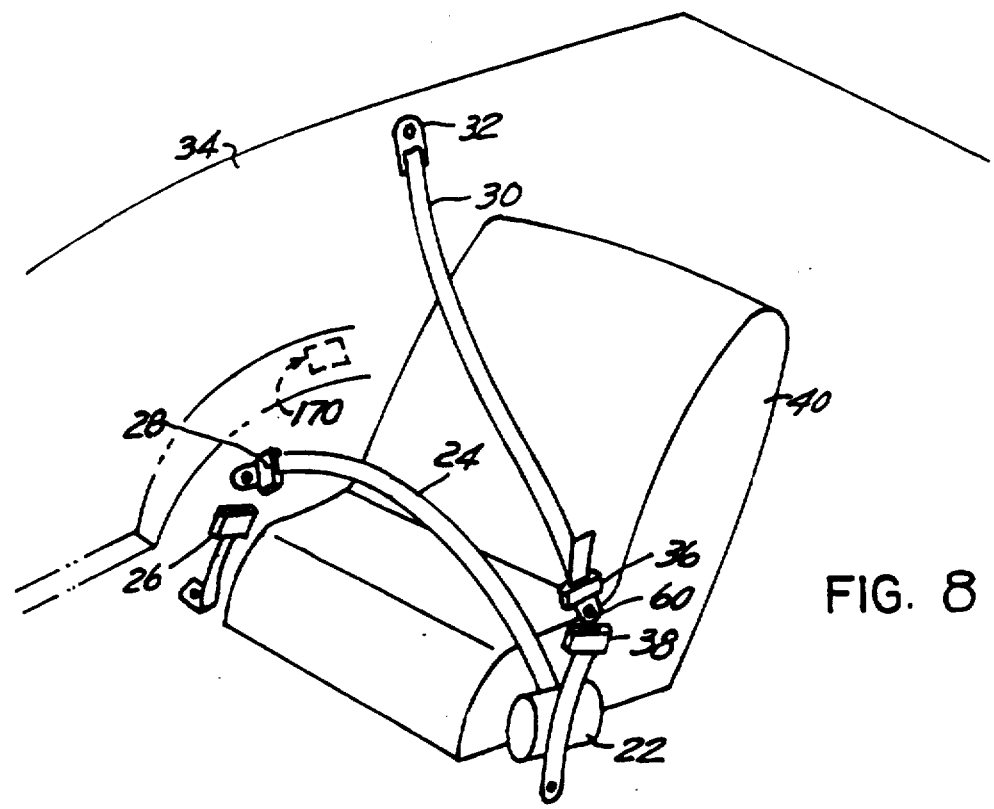

Reference is made to FIG. 5 which shows an alternate embodiment of the present invention. In this embodiment of the invention the storage mechanism 50' is adapted to be inserted within an opening 150 (see FIG. 7) in a side trim or fascia 151 of the interior of the vehicle proximate the seat 40. In this embodiment of the mechanism 50', the base 54 is fabricated with extending legs 152 and 154 defining a spacing 156 therebetween. The flange portion 80 of the mechanism 50' has a mounting hole 158 (which replaces the larger belt opening 82 shown in FIGS. 2 and 3). In operation, the mechanism 50', i.e., buckle 52', is slid within the opening 150 such that a lower portion 160 of the trim or fascia 151 is received within the spacing 156 The mechanism 50' is further secured to the trim by fastener such as 162 received through the hole 158 and secured within the trim panel through a hole 164. From FIG. 1 it approximately at or near occupant shoulder height in the side trim panel. This is not a requirement of the invention, that is, the mechanism 50' can equally be located in other portions of the interior trim of the vehicle, such as proximate the elbow rest shown by the opening 170 in FIG. 8.

Figure 6:
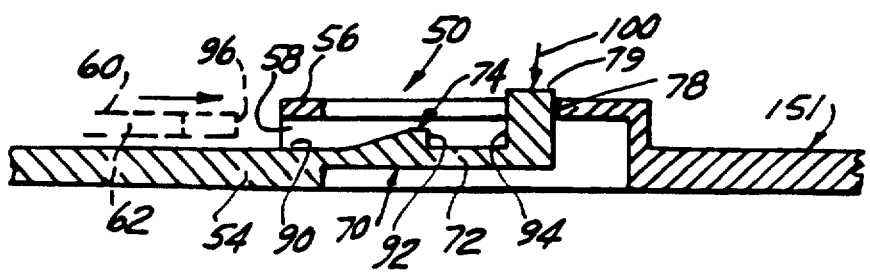

As previously mentioned, it is contemplated that the storage mechanism 50 be fabricated by a material molding technique. As is known in the art, many portions of the interior trim of a vehicle are also molded components. As such, FIG. 6 contemplates a third embodiment of the invention wherein the latching mechanism 50 is fabricated as an integral part of the interior trim or fascia 151.

Many changes and modifications in the above described embodiment of the invention can, of course, be carried out without departing from the scope thereof. Accordingly, that scope is intended to be limited only by the scope of the appended claims.

I claim:

1. A one-piece buckle storage assembly (50) for storing a latch plate (36, 60) of a safety belt (30) when not restraining an occupant of a vehicle, the buckle assembly (50) is constructed of a one-piece fabrication comprising a base (54) and a cover (56) having a first opening (78) the base and cover cooperatively defining a slot (58) for receiving the latch plate (36, 60) of the safety belt, an integrally formed lock plate (70) proximate the entrance of the slot, and movable in a direction generally perpendicular to the direction of insertion of the latch plate, the lock plate (70) including first means, positioned in the path of the latch plate and forming a lower surface of the slot (58) including lock means (74, 78, 92) for engaging a second opening (62) in the latch plate (36, 60) and a release button (76) formed as an integral part of the lock plate (70) for moving the lock means (74) out from the second opening (62) to permit retraction of the latch plate from the buckle assembly.

2. The assembly as defined in claim 1 wherein the first means (70) comprises a stem portion (72) extending from the base (54) including a ramp portion (76) extending upwardly from the stem portion (72) such that as the latch plate is inserted within the slot (58) the latch plate engages the ramp portion urging the stem portion away from the latch plate (36) and wherein as the latch plate is further inserted into the slot (58), the lock means moves within the second opening therein securing the latch plate (36).

3. A system incorporating the assembly of claim 2 wherein the base (54) includes a flange (80) including a third opening (82) adapted to be secured to an end (120) of the safety belt (30).

4. A one-piece buckle storage assembly (50) for storing a latch plate (36, 60) of a safety belt (30) when not restraining an occupant of a vehicle, the vehicle including interior trim (151), the buckle assembly (50) is constructed of a one-piece fabrication and adapted to be attached to the trim wherein the trim (151) includes a mounting opening (150) and the assembly (50) includes mounting means (152, 154) adapted for enveloping a portion of the trim proximate the mounting opening and wherein the assembly (50) includes securing means (80, 158) for securing another portion of the assembly to the trim wherein the securing means includes a flanged portion (80), generally opposite a split leg portion (152, 154), forming the mounting means, having an opening (158) therein for receipt of a fastener for attaching the flanged portion (80) to the trim.

5. The assembly (50) as defined in claim 4 comprising a base (54) including the mounting means (152, 154) and a cover (56) including the securing means and having a first opening (78), the base and cover cooperatively defining a slot (58) for receiving the latch plate (36, 60) of the safety belt, an integrally formed lock plate (70) proximate the entrance of the slot, and movable in a direction generally perpendicular to the direction of insertion of the latch plate, the lock plate (70) including first means, position in the path of the latch plate and forming a lower surface of the slot (58) including lock means (74, 78, 92) for engaging a second opening (62) in the latch plate (36, 60) and a release button (76) formed as an integral part of the lock plate (70) for moving the lock means (74) out from the second opening (62) to permit retraction of the latch plate from the buckle assembly.

6. The assembly as defined in claim 5 wherein the first means (70) comprises a stem portion (72) extending from the base (54) including a ramp portion (76) extending upwardly from the stem portion (72) such that as the latch plate is inserted within the slot (58) the latch plate engages the ramp portion urging the stem portion away from the latch plate (36) and wherein as the latch plate is further inserted into the slot (58), the lock means moves within the second opening therein securing the latch plate (36).

7. A one-piece buckle storage assembly (50) for storing a latch plate (36, 60) of a safety belt (30) when not restraining an occupant of a vehicle, the buckle assembly (50) is constructed of a one-piece fabrication wherein the vehicle includes interior trim (151) of generally the same material as the assembly and wherein the assembly and trim are of integral construction.

8. The assembly (50) as defined in claim 7 comprising a base (54) and a cover (56) both formed integrally with the trim, the cover (56) having a first opening (78), the base and cover cooperatively defining a slot (58) for receiving the latch plate (36, 60) of the safety belt, an integrally formed lock plate (70) proximate the entrance of the slot, and movable in a direction generally perpendicular tot he direction of insertion of the latch plate, the lock plate (70) including first means, positioned in the path of the latch plate and forming a lower surface of the slot (58) including lock means (74, 78, 92) for engaging a second opening (62) in the latch plate (36, 60) and a release button (76) formed as an integral part of the lock plate (70) for moving the lock means (74) out from the second opening (62) to permit retraction of the latch plate from the buckle assembly.

9. The assembly as defined in claim 8 wherein the first means (70) comprises a stem portion (72) extending from the base (54) including a ramp portion (76) extending upwardly from the stem portion (72) such that as the latch plate is inserted within the slot (58) the latch plate engages the ramp portion urging the stem portion away from the latch plate (36) and wherein as the latch plate is further inserted into the slot (58), the lock means moves within the second opening therein securing the latch plate (36).

10. The assembly as defined in claim 9 wherein a sleeve or boot (124) is positioned about the safety belt to envelope the first and second sections, and second loop.

11. The system as defined in claim 7 wherein the trim and assembly are molded as an integral structure.

12. A one-piece buckle storage (50) for storing a latch plate (36, 60) of a safety belt (30) when not restraining an occupant of a vehicle comprising a base (54) and a cover (56) having a first opening (78), the base and cover cooperatively defining a slot (58) for receiving the latch plate (36, 60) of the safety belt, an integrally formed lock plate (70) proximate the entrance of the slot, and movable in a direction generally perpendicular to the direction of insertion of the latch plate.

the lock plate (70) including first means, positioned in the path of the latch plate and forming a lower surface of the slot (58) including lock means (74, 78, 92) for engaging a second opening (62) in the latch plate (36, 60) and a release button (76) formed as an integral part of the lock plate (70) for moving the lock means (74) out from the second opening (62) to permit retraction of the latch plate from the buckle assembly; wherein the first means (70) comprises a stem portion (72) extending from the base (54) including a ramp portion (76) extending upwardly from the stem portion (72) such that as the latch plate is inserted within the slot (58) the latch plate engages the ramp portion urging the stem portion away from the latch plate (36) and wherein as the latch plate is further inserted into the slot (58), the lock means moves within the second opening therein securing the latch plate (36) wherein the base (54) includes a flange (80) including a third opening (82) adapted to be secured to an end (120) of the safety belt (30), wherein a portion of the safety belt (30) is configured as follows to allow attachment to the buckle storage assembly and to an anchor plate (110) which includes a fourth opening (114) and which is adapted to be connected to the vehicle, one end of the safety belt is received through the third opening (82) of the assembly, looped to form a small, relatively flat, first loop secured in a downward orientation to a first section of the safety belt, the safety belt extends through the fourth opening (114) to form a second loop, the second loop is formed by securing the first section to a second section of the safety belt, in the vicinity of the anchor plate (110), the second section extends from the second loop and is attached at a remote end thereof to the latch plate (36, 60);

the safety belt, when not securing an occupant lays vertically in the vehicle with the first loop and assembly adjacent the second section of the safety belt.

* * * * *